Jan. 19, 1971  W. F. MORRIS, JR  3,555,838
GIBLET PUMPING AND CHILLING METHOD AND APPARATUS
Filed Jan. 17, 1969  5 Sheets-Sheet 1
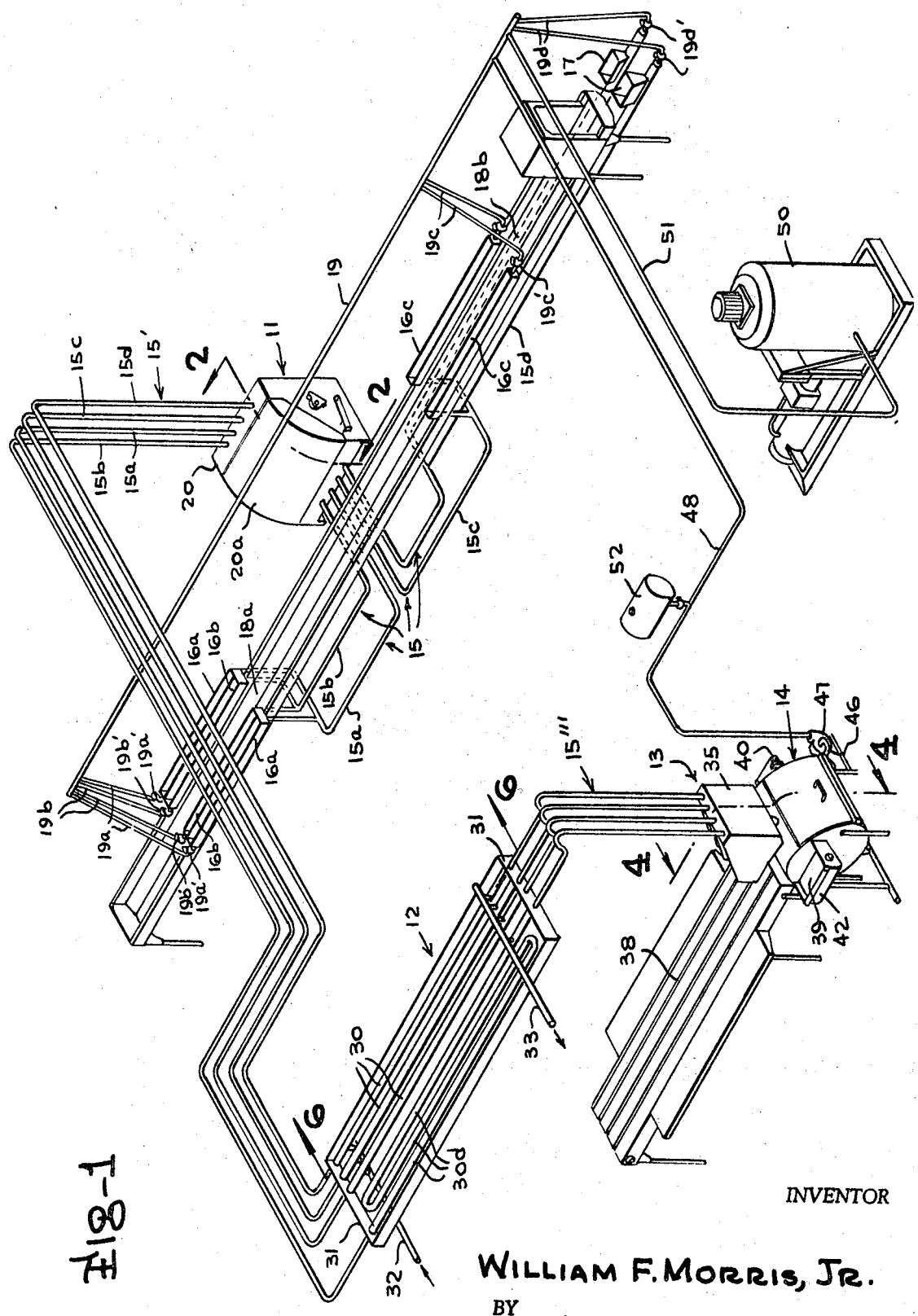
INVENTOR
WILLIAM F. MORRIS, JR.
BY
Mason, Fenwick & Lawrence
ATTORNEYS

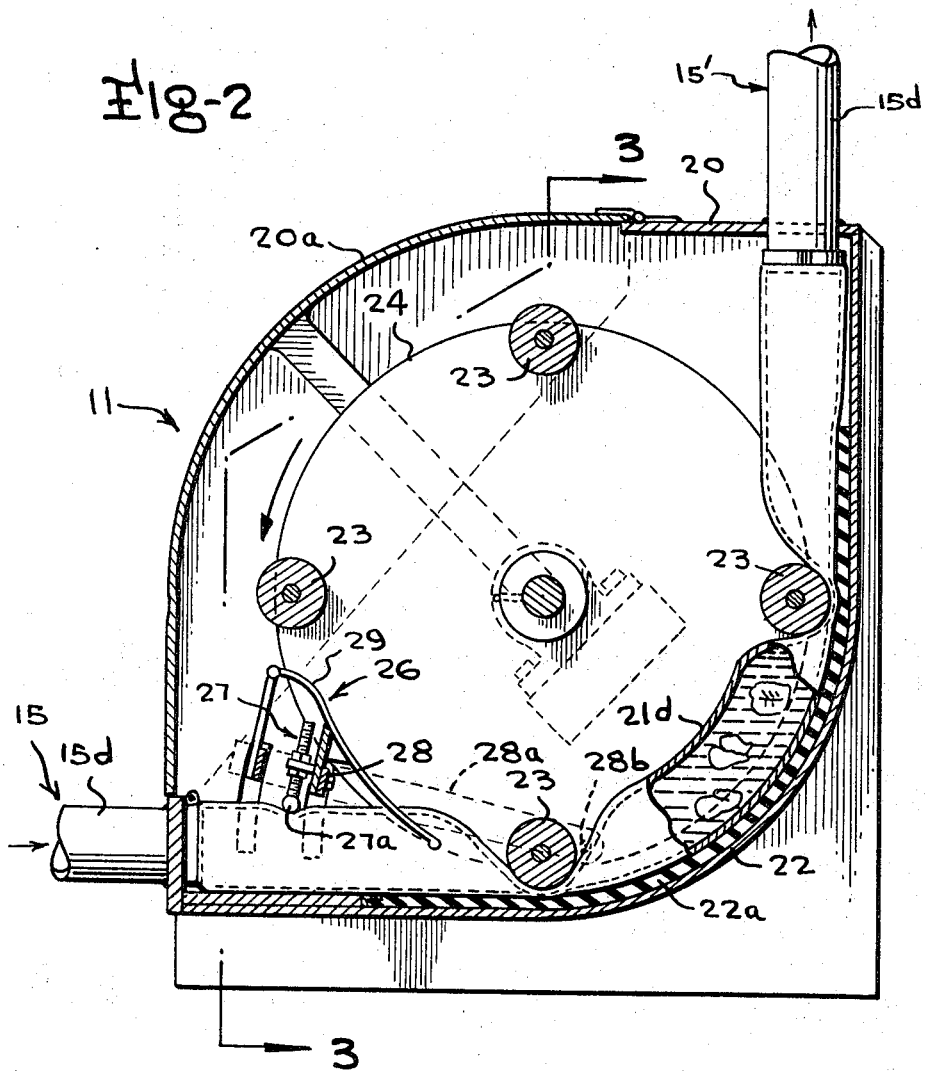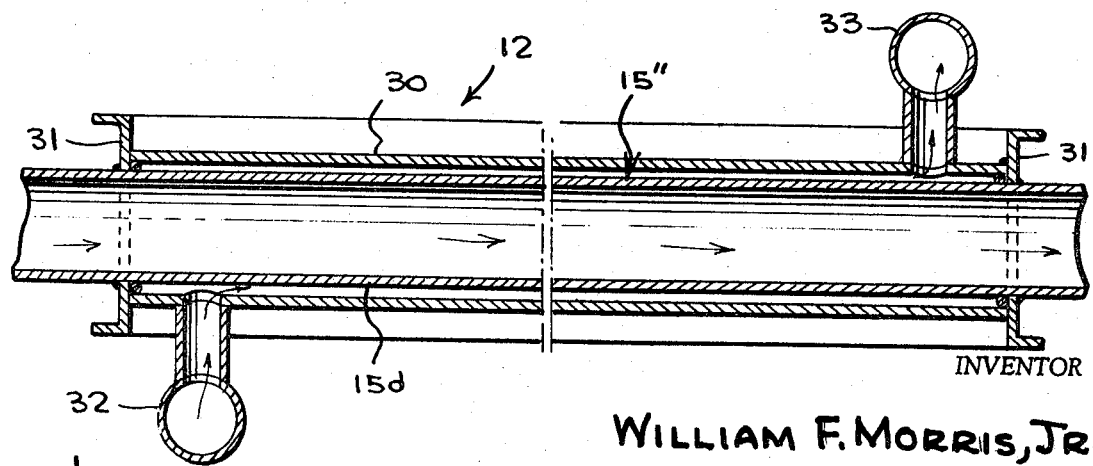

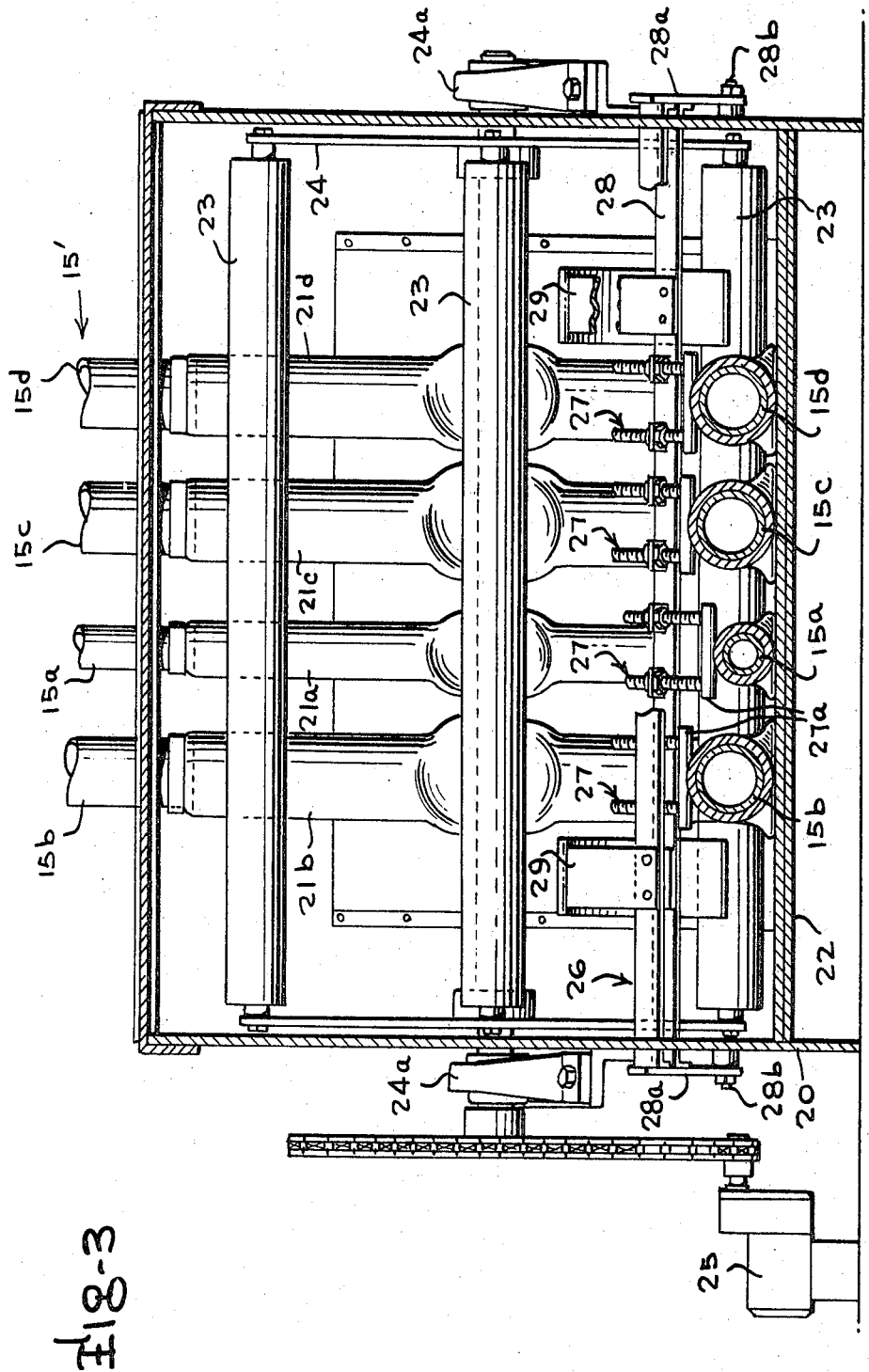

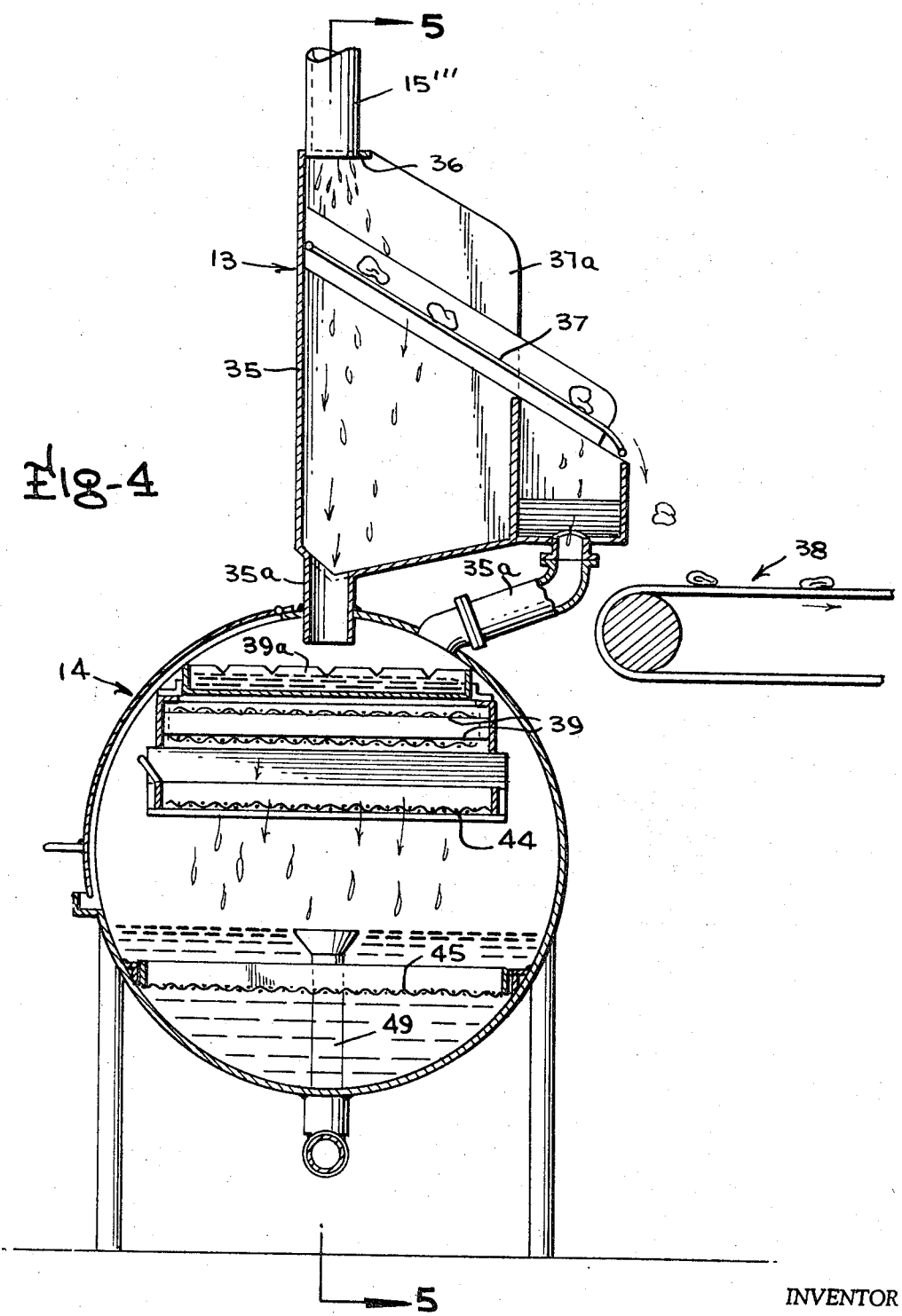

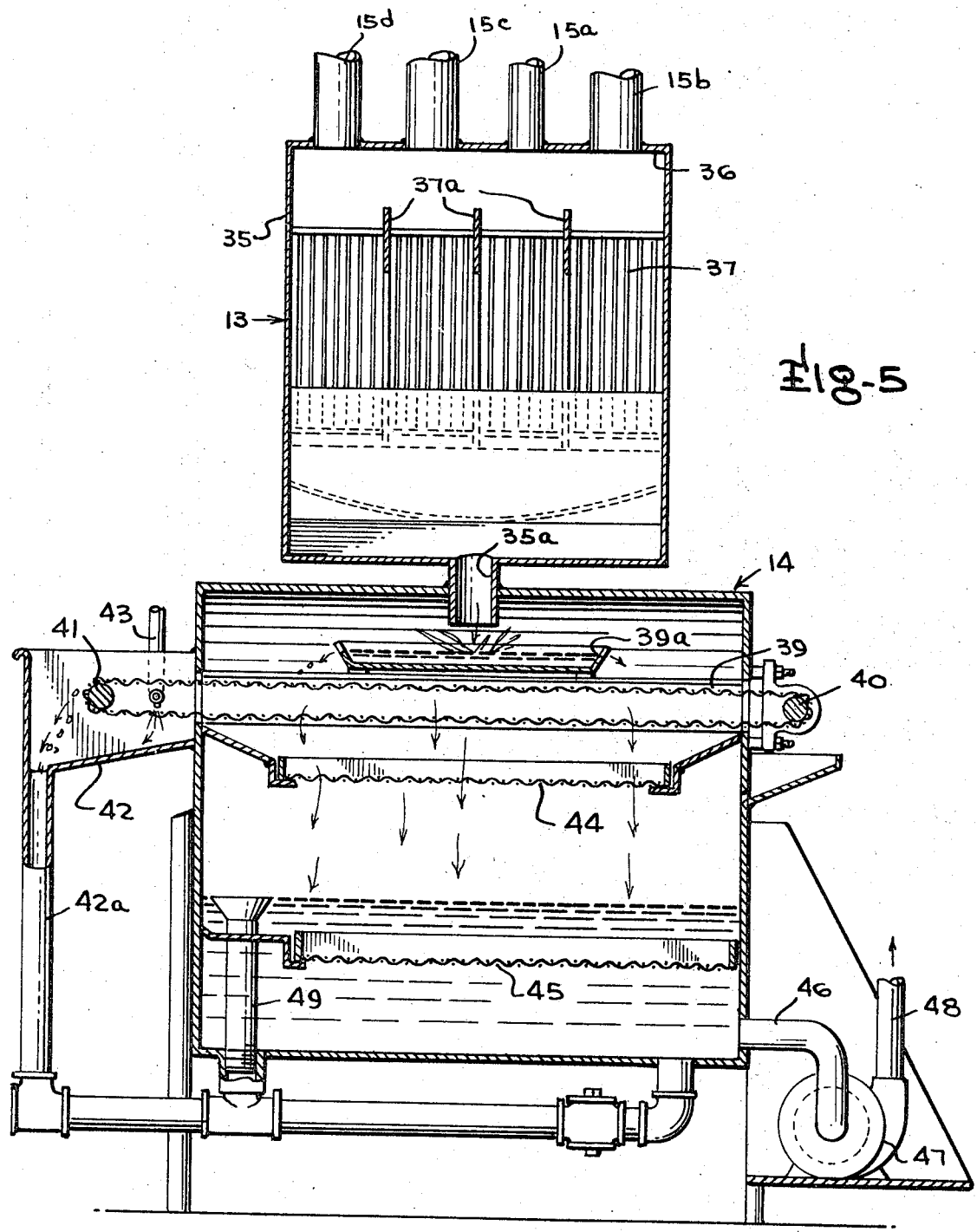

United States Patent Office 3,555,838
Patented Jan. 19, 1971

3,555,838
GIBLET PUMPING AND CHILLING METHOD
AND APPARATUS
William F. Morris, Jr., 801 Fayetteville St.,
Raleigh, N.C. 27602
Filed Jan. 17, 1969, Ser. No. 791,950
Int. Cl. F25d 25/04
U.S. Cl. 62—63                                      12 Claims

ABSTRACT OF THE DISCLOSURE

A method and apparatus for pumping and chilling giblets wherein the different types of giblets are conveyed through enclosed conduit circuits, each circuit for a different type of giblet, from a harvesting station to a packaging station, by depositing the giblets in a stream of chilled water circulating through each of the circuits to propel the giblets therethrough, subjecting the water and giblets to heat exchange with a coolant during movement through the circuitry, separating the giblets from the water, and recirculating the water through the circuits.

BACKGROUND AND OBJECTS OF THE INVENTION

The present invention relates to a method and apparatus for chilling poultry giblets in a poultry processing plant promptly after the birds are eviscerated wherein the giblets are separated from the processing line for the poultry carcasses and are advanced in a chilled liquid medium through an enclosed conduit system passing through a series of heat exchangers.

In the processing of poultry in plants to prepare the poultry for marketing, the birds are slaughtered and eviscerated, and the edible viscera or giblets, consisting of the heart, liver and gizzard, together with or without the neck, are collected and processed separately from the poultry carcasses or cut-up poultry pieces. Because the birds and the parts thereof are rapidly perishable after slaughter and evisceration, and bacterial action begins promptly thereafter, it is important to reduce the temperature of the carcasses and any of the edible bird parts down to at least below about 40° F. to remove the body heat very rapidly after the slaughtering process so as to slow down the rate of bacterial growth. Since the time and temperature requirements for chilling giblets differ from those required for the carcasses or larger poultry pieces, and the physical nature of giblets requires different handling techniques from those used in chilling carcasses, the giblets are separated from the processing line for the bird carcasses and separately chilled to the desired temperature range.

The present invention is directed to a novel method and apparatus for chilling the giblets, in a manner which conserves space in the processing plant and provides for effective and reliable chilling of the giblets in an efficient manner to the desired low temperature levels which effects concurrent washing and chilling of the giblets while they are being transported to a desired location for packing, and wherein contamination and loss of product are minimized. More specifically, by the present invention, the giblets are placed in flumes or troughs immediately after harvesting from the bird carcasses and are transported by chilled water, forming the transporting medium for the giblets, to a pump, where they are propelled through a series of tubular conduits passing through heat exchangers to provide the necessary time and temperature conditions for proper chilling of the parts. The liver, gizzard, neck and the heart are each transported through separate respective tubular conduits and are delivered to a separating station where the giblets are separated from the chilled water medium and discharged for packaging by personnel in the plant. In the interest of conserving refrigeration, approximately 80% of the chilled water forming the transporting medium is strained through a system of continuously flushed screens in a sump located immediately below the separating station, and is then recirculated through the system. Provision is made for injection of approximately 20% of fresh chilled water into the recirculating transporting medium to maintain clarity of transporting water and to meet government requirements. If desired, a system of chlorination of the recirculated medium may also be provided to further reduce bacterial count.

An object of the present invention is the provision of a novel method and apparatus for pumping and chilling giblets wherein the giblets are withdrawn from a poultry processing line and different types of giblets are transported separately through individual processing circuits passing through heat exchangers for concurrently washing, transporting, and chilling of the giblets, and wherein the giblet processing system is arranged so as to conserve floor space and minimize the possibility of contamination or loss of product.

Other objects, advantages and capabilities of the present invention will become apparent from the following detailed description taken in conjunction with the accompanying drawings, illustrating a preferred embodiment of the invention.

BRIEF DESCRIPTION OF THE FIGURES

FIG. 1 is a diagrammatic perspective view of a giblet pumping and chilling system embodying the present invention;

FIG. 2 is a vertical transverse section view of the giblet pump, taken along the line 2—2 of FIG. 1;

FIG. 3 is a vertical longitudinal section view of the giblet pump taken along line 3—3 of FIG. 2 together with an illustration in phantom lines of one of the flumes connected thereto;

FIG. 4 is a vertical transverse section view of the giblet separating device and associated sump, taken along the line 4—4 of FIG. 1;

FIG. 5 is a longitudinal section view taken along the line 5—5 of FIG. 4; and

FIG. 6 is a longitudinal section view of one of the heat exchangers, taken along the line 6—6 of FIG. 1.

DETAILED DESCRIPTION OF A PREFERRED EMBODIMENT

Immediately prior to the removal of the giblets for processing in accordance with the present invention, the poultry is slaughtered, scalded, picked and eviscerated in the customary manner. Promptly following such process steps, the picked and eviscerated carcasses are introduced into a poultry chiller to reduce the carcass temperature to below 40° F. in a known manner not pertinent to the present invention. For example, the carcasses may be introduced into a chiller of the construction disclosed in my earlier U.S. Pat. No. 3,410,101, and concurrently, the edible viscera, specifically, the hearts, livers and gizzards, together with or without the necks, which collectively constitute the giblets, are assembled for processing along a giblet processing line in a different manner from the processing of the carcasses.

The basic elements making up the giblet processing line are illustrated in FIG. 1 and essentially comprise a giblet pump 11, a heat exchanger assembly 12, and a separating device 13 and associated sump 14. Because the livers are more fragile and thus more likely to be broken up than the other types of giblet parts and because the necks require a longer chilling period than the other giblet parts, and also to reduce the labor required to separate the giblets for packing if they are mixed together, it is desirable to provide a plurality of transporting lines along which the giblets are conveyed from the pump through the heat exchanger to the separating device so that the livers can all be conveyed along a first channel or circuit, the necks along a second channel or circuit, and the hearts and gizzards along third and fourth channels or circuits to avoid damage to the livers such as may occur if they are intermingled with other types of giblet parts and to permit longer chilling periods for the necks and also to reduce packing labor. This is accomplished by transporting the giblets in a plurality of tubular conduits 15a, b, c, and d, extending through the giblet pump 11 and heat exchanger 12 through the separating device 13. For example, the tubular conduit 15a may be a two-inch diameter pipe, preferably of stainless steel defining a circuit for the hearts, the conduits 15b and c may be three inch outer diameter stainless steel pipes for conveying the livers and gizzards, respectively, and the conduit 15d may be a three inch outer diameter stainless pipe for conveying the necks. As will be observed from FIG. 1, the tubular conduits 15a to 15d rise vertically from the giblet pump 11 along parallel courses to an overhead location adjacent the ceiling of the processing room, and then course along generally parallel paths, preferably along a rising grade, for example, of about three inches in every twenty linear feet, through one or a plurality of heat exchanges 12 to a location overlying the separating device 13 and sump 14, where the conduits descend to the separating device 13.

To facilitate introduction of the respective types of giblet parts into the appropriate circuits or channels in the giblet processing line, a plurality of upwardly opening, elongated flumes or chutes 16a, 16b and 16c are provided to receive the hearts, livers and gizzards, respectively, each of the flumes 16a, 16b and 16c being connected to the inlet ends of the tubular conduits 15a, 15b and 15c, respectively, upstream from the giblet pump 11. An upwardly opening funnel, hopper or short flume 17 is also connected to the inlet end of the tubular conduit 15d upstream from the giblet pump to facilitate feeding of the necks into the conduit 15d. In the specific example illustrated in FIG. 1, flumes 16a and 16b designed to receive the hearts and livers, respectively, are provided along each of the opposite lateral edges of a trough section 18a adjacent the giblet pump 11 to form heart and liver harvest stations, and flumes 16c are provided along each of the opposite lateral edges of a trough section 18b to form a gizzard harvesting station, while the funnel 17 to receive the necks is spaced from the two previously mentioned harvest stations at the neck harvesting station.

Chilled water, forming the liquid transporting medium for the giblets, is supplied from an overhead manifold 19 to the inlet end portion of the neck conduit 15d, for example, by a descending supply pipe 19d opening into the conduit 15d at the bend or elbow therein at the bottom of the vertical inlet conduit section immediately adjoining the funnel 17. The chilled water is also supplied to the flumes 16a, b and c by descending supply pipes 19a, b and c opening into the ends of the flumes 16a, b and c, respectively, remote from the giblet pump 11 to provide a current of chilled water in each of the flumes 16a, b and c running from the remote ends to the proximal ends thereof relative to the giblet pump. The inlet sections, collectively indicated at 15, of the tubular conduits 15a, b and c, connect to the proximal ends of the flumes 16a, b and c and extend through the lower front wall of the pump housing 20 to terminate just inwardly of the pump housing 20 as illustrated in FIG. 3. Likewise, the tubular conduit 15d extends from the neck funnel 17 to a similar location within the pump housing 20 and preferably extends along a continuously declining grade from the neck harvesting station to the pump 11.

The pump 11 is of the so-called peristaltic type designed to impart pulsating pumping action to the liquid transporting medium and giblets within the tubular conduits, and comprises the housing 20 having a hinged front cover 20a, and a plurality of flexible hose sections 21a, b, c and d within the pump housing interposed in the tubular conduits 15a–d between the outlet ends of the rigid inlet conduit sections 15 and the inlet ends of the rigid conduit sections collectively indicated at 15'. The flexible hose sections 21a–d extend side-by-side along arcuate paths concentric with the horizontal axis and adjacent a concave back-up plate 22 and are engaged and pressed to a closed condition against rubber backing 22a covering the confronting surface of the back-up plate to effect pumping of the contents of the conduits by a plurality of circumferentially spaced rollers 23, for example, supported in quadrature relation on a motor driven rotor frame 24 having trunnions journaled in bearings 24a supporting the frame for rotation about the axis of curvature of the back-up plate 22. It will be apparent that upon rotation of the rotor frame 24, driven, for example, by an elecric motor 25, the rollers 23 will be advanced in a circumferential path into engagement with the flexible hose sections 21a and 21d and will press the flexible hose sections toward the back-up plate 22 to a closed condition whereupon further rotation of the rotor frame will advance a column of chilled water and giblets in each of the hose sections toward the inlets of the conduit sections 15' for a forward pumping stroke corresponding to the length of travel of one of the rollers 23 in closing contact with the hose sections 21a–d, following which the column will drop back slightly or experience a short reverse stroke.

To avoid possible injury to giblets in the hose sections when the hose sections are engaged by the rollers 23, a damper or timing bar assembly 26 is provided in the pump 11 comprising a plurality of damper bar members 27, for example, U-shaped members having a lower cross-bar 27a, and threaded upwardly projecting legs, supported for vertical adjustment on a mounting bracket 28 which is carried by a pair of lever arms 28a pivoted to the pump housing at 28b. An upwardly projecting extension of the mounting bracket 28 also carries concave shoe members 29 spaced along the bracket 28 and normally disposed in the circumferential path of the rollers 23 to be engaged and forced downwardly through a selected stroke by each of the rollers as they approach engagement with the hose sections 21a to d. When the shoe members 29 are engaged by a roller and forced to the position illustrated in FIG. 2, the damper bar members 27 are concurrently moved downwardly to press the hose sections below them to within about one-quarter to one-half inch of total closure at a location spaced an appropriate distance upstream from the point of engagement of the rollers with the hose sections to substantially block off the hose sections at the damper bar zones to the passage of giblets but not the water and minimize the possibility of giblets occupying positions which would cause them to be crushed by the rollers 23 when the rollers depress the hose section. Due to the vertical adjustability of the individual damper bar member 27, one of which is provided for each hose section, any of the damper bar members can be adjusted individually or elevated to a position taking them out of action, if desired.

The hearts, livers, gizzards, and/or necks are conveyed from the giblet pump 11 along the outlet conduit sections 15' in their respective conduits 15a, b, c and d, through one or more heat exchangers 12, wherein the stainless steel conduits simply pass in concentric enclosed relation through surrounding outer pipes 30 sealed at their opposite ends to the inner conduit walls by bulkhead plates 31 or similar members, the outer pipes 30 being spaced from the walls of the inner tubular conduits, here indicated at 15" and forming the heat exchanger sections of the outlet conduit lines 15', to provide space for passage of a suitable cooling fluid, such as glycol, ammonia or freon, in the sealed space therebetween. The refrigerant may be circulated through the space defined between the outer pipes 30 and the inner tubular conduits 15″ by a supply header 32 communicating with such spaces adjacent one end of the pipes 30 and by a return header 33 communicating with such spaces adjacent the opposite ends of the pipes 30. In one practical example, the outer pipes 30 may be three and one-half inch tubing having 16 gauge walls and may be about nineteen and a half feet long. Since the necks require a longer cooling period than the giblet parts, a multiple pass heat exchanger may be provided for the neck circuit formed by the tubular conduit 15d by providing three outer heat exchanger pipes 30d positioned in side-by-side relation, and recurving the tubular conduit 15d through 180° at the outlet end of the first heat exchanger pipe 30d to enter the corresponding end of the second pipe 30d and similarly recurving the conduit 15d exiting from the opposite end of the second pipe 30d to enter the corresponding end of the third pipe 30d, whereby the necks are caused to make three passes through the heat exchanger for the neck circuit to provide proportionately more time and surface for cooling since necks weigh as much as the total of the other three giblets.

After passage through the heat exchanger 12, the giblets are then conveyed through their respective tubular conduits to the descending terminal sections 15‴ of the conduits where they discharge downwardly into the separating device 13. The separating device 13, as is more clearly illustrated in FIGS. 4 and 5, comprises a forwardly opening housing 35 having a top wall through which the conduits 15a–d descend and terminate immediately below the top wall 36, discharging the fluid transporting medium and the giblets downwardly against an inclined separating screen 37 formed of parallel laterally spaced rods disposed in a plane inclining downwardly through the open front of the housing 35 to retain and discharge the giblets onto a packaging table 38 while the chilled water passes downwardly between the rods into the lower region of the housing 35 and is discharged by drain tubes 35a into the top of the sump 14. Vertical partitions 37a separate the area of the screen 37 into four channels for the respective types of giblets. As more clearly illustrated in FIGS. 4 and 5, the sump 14 in the preferred embodiment is in the form of an elongated cylindrical tank having an endless belt type screen 39 in the upper region thereof forming a perforate barrier onto which the chilled water is discharged from the overflow pan 39a disposed to receive water from the drain tubes 35a. The endless screen 39 is trained about an idler roller 40 adjacent one end of the sump and extends through an opening in the opposite wall of the sump about a driven roller 41 located in a screen washer extension 42 mounted on one end of the sump. Any small particles of tissue, etc., which pass between the rods of the separating screen 37 with the chilled water are collected on the upper flight of the screen 39 and carried by continuous movement of the screen 39 into the washer extension 42 where tap water discharged downwardly through the lower flight of the screen from the washer header 43 dislodges the particles from the screen for removal through the outlet drain 42a to prevent any partial stoppages in valves 19a′, 19b′, 19c′, 19d′ controlling water supply to each individual product flumes 16a–c, 17 which could cause product damage if insufficient water is present to completely flow incompass the product. The chilled water which passes through the screen 39 descends through a second screen 44 removably located in the upper region of the sump and through another set of screening rods 45 spanning the lower region of the sump into the bottom portion of the sump, where it is withdrawn through the bottom outlet conduit 46 and a conventional sanitary pump 47 for return as recirculation medium through pipe 48 to the supply header 19. It will be noted that a stand pipe drain 49 is also provided in the lower region of the sump 14 at the end opposite the return conduit 46, which projects a selected vertical distance, for example, about 10 inches, above the bottom of the sump to provide an elevated inlet opening at the top spaced slightly above the level of the screening rods 45. This stand pipe drain is connected to a sewer system, as is the outlet drain 42a. The rate of water circulation is such that the water level in the sump is at the level of the inlet opening of the stand pipe drain 49, producing a selected rate of overflow into the drain 49. Also, when flushing the system with sanitizing solution during cleaning cycles, grease and floating particles may be flushed from the sump by discharge through the stand pipe drain 49.

In order to meet government standards, approximately 1 gallon per 40 sets of giblets of fresh chilled water is continuously injected into the system. This is derived from the conventional commercially available water chiller 50, the chilled water outlet of which is connected by pipe 51 to the overhead manifold 19 to supply the fresh makeup water thereto along with the recirculating chilled water being returned through the pipe 48.

Also, if desired, a conventionel chlorinator 52 may be connected to the recirculation pipe 48 between the pump 47 and the overhead manifold 19 to effect chlorination of the recirculating water and thereby reduce the bacteria count.

In the use of the above-described apparatus, the giblets are introduced into the conduit system defined by conduits 15a and 15d at the liver, heart, gizzard, and neck harvest stations. Specifically, the hearts are manually deposited in the flumes 16a and are carried by the currents of chilled water in these flumes into the inlet section 15 of the tubular conduit 15a where they travel into the flexible hose section 21a in the pump 11 and are pumped along with the chilled water forming the transporting medium into the outlet section 15′ of the conduit 15a by the action of the rollers 23 on the flexible hose section 21a. The hearts are progressively cooled by their emersion in the chilled water serving as the transporting medium as they travel through the conduit 15a, and achieve final chilling to below 40° F. in the heat exchanger 12 by thermal interchange with the refrigerant circulating in the space between the outer heat exchanger pipes 30 and the conduit portion 15a extending co-axially therethrough, after which the hearts are discharged downwardly through the descending conduit section 15‴ into the separating device 13. There, the hearts are separated from the chilled water transporting medium by the inclined screen structure 39 and discharged gravitationally through the open front of the separating device housing 35 onto the packaging table while the chilled water passes through the screen 39 and into the sump 14 to be returned to the overhead manifold 19 through the outlet conduit 46, pump 47, and recirculating pipe 48. Any particles entrained with the chilled water which passes through the screen 37 are collected on the continuously moving upper flight of the screen 39 and are flushed from this screen in the screen washer extension 42 where they are discharged through the outlet drain 42a into the sewer system.

Similarly, the livers and manually deposited in the flumes 16d, the gizzards are deposited in the flumes 16c, and the necks in the funnel 17 and are conveyed by the chilled water discharged into these flumes and funnel through their respective tubular conduits 15b, 15c and 15d through the pump 11 and heat exchanger 12 to the separating device 13 where they are separated out from the chilled water transporting medium by the separating screen structure 37 and discharged onto the packaging table, while the chilled water which carried them to the separating structure 13 discharges into the sump 14 and is returned through recirculating pipe 48 to the over head manifold 19. By this arrangement, each of the different types of poultry giblets are conveyed through separate transporting circuits individual to each giblet type from the harvesting stations to the packaging station by conduit systems which can be run at ceiling level and thus positioned out of the way to achieve considerable savings of floor space. The giblets are washed and chilled simultaneously while being transported from the harvesting stations to the packaging station, using as the transporting medium chilled water so that progressive chilling can occur during travel of the giblets from the pump to the heat exchanger. The heat exchanger, therefore, need only provide the additional cooling needed to bring the already somewhat cooled giblets down to the desired tempearture level. It will be apparent that either a single heat exchanger of appropriate length, or a series of heat exchangers, can be provided along the outlet section 15' of the tubular conduits 15a to 15d at ceiling level to achieve the necessary tempearture reduction of the giblets during their travel from the pump 11 to the separating device 13. Also, by arranging the neck conduit 15d so that it makes a plurality of passes through its associated heat exchanger portion, a convenient arrangement is provided to achieve the desired temperature reduction in the necks which require a longer cooling period and more cooling surface than other types of giblets. The above-described system is also advantageous in that it can be readily cleaned, simply by introducing sanitizing solution into the overhead manifold 19, for example, by introduction into the supply pipe 51 leading from the water chiller 50 thereto and valving the recirculation pipe 48 to divert its contents into a suitable discharge drain into the sewer system, as the sanitizing solution will then flow through all of the parts of the system which come in contact with the giblets and assure thorough and effective sanitizing of all of the surfaces exposed to the giblets. Automatic timer means may be provided, if desired, to automatically sanitize and flush the system on a preset time and temperature cycle to effect periodic sanitizing without requiring disassembly of any of the system components.

What is claimed is:

1. Apparatus for transporting giblets along a transport path portion located at an overhead level adjacent the ceiling of a poultry processing room to convey the giblets from a giblet harvesting station to a packaging station both located at a workers level and concurrently chill the giblets to a temperature below about 40° F. during transportation thereof between said stations, comprising a plurality of tubular conduits each having an unobstructed interior extending the whole length thereof between said stations and each respectively defining a separate continuous enclosed liquid conveying circuit having an inlet at the harvesting station and an outlet at said packaging station, upwardly opening receptacle means at said harvesting station communicating with said inlets for manual deposit of the giblets therein, supply pipe means for delivering chilled water to the conduits adjacent said inlets, giblet separating means connected to said outlets for separating the giblet from each transporting stream of chilled water and discharging the giblets to the packaging station, a giblet pump housing through which said conduits pass located adjacent said inlets, said conduits for each circuit including first and second vertical conduit portions extending upwardly from said pump means and separating means respectively to said overhead level and a major conduit portion interconnecting the upper ends of the vertical conduit portions and located at said overhead level to provide walk-under space beneath the major conduit portion, heat exchanger means through which said major conduit portions pass located between said pump housing and said separating means for conveying a coolant in thermal exchange relation to the water and giblets in said conduits, each of said conduits within said pump housing include a flexible hose section extending along an arcuate path concentric with a horizontal axis against a concave backup plate, and driven roller means in said housing rotatable in a cylindrical path about said axis to periodically engage and press said hose section against said backup plate to closed condition at a zone which progresses along said arcuate path to impart pulsating pumping action to the chilled water and giblets in said conduits and thereby form a transporting stream of chilled water for conveying the giblets in the conduits in immersed relation to said outlets.

2. Apparatus for transporting and chilling giblets as defined in claim 1, wherein said receptacle means comprises elongated upwardly opening flume means at the harvesting station, said conduit inlets being connected to a first end of said flume means to receive the giblets deposited in said flume means, and said supply pipe means for supplying chilled water to said conduit means comprising pipe means discharging chilled water into a second end of said flume means opposite said first end to produce a current of water for carrying the giblets into said inlet.

3. Apparatus for transporting and chilling giblets as defined in claim 1, wherein said separating means includes collecting means for collecting the chilled water discharged through said outlets upon separation of the giblets therefrom, strainer means for screening selected particulate material from the collected chilled water and means for recirculating the collected and screened chilled water to said supply pipe means to provide part of the chilled water supply to said conduits.

4. Apparatus for transporting and chilling giblets as defined in claim 2, wherein said separating means includes collecting means for collecting the chilled water discharged through said outlets upon separation of the giblets therefrom, strainer means for screening selected particulate material from the collected chilled water and means for recirculating the collected and screened chilled water to said supply pipe means to provide part of the chilled water supply to said conduits.

5. Apparatus for transporting and chilling giblets as defined in claim 1 wherein said separating means includes collecting means for collecting the chilled water discharged through said outlets upon separation of the giblets therefrom, strainer means for screening selected particulate material from the collected chilled water, means for recirculating the collected and screened chilled water to said supply pipe means to provide part of the chilled water supply to said conduits, and water chiller means connected to said supply pipe means to provide a selected proportion of fresh chilled water thereto.

6. Apparatus for transporting and chilling giblets as defined in claim 2, wherein said separating means includes collecting means for collecting the chilled water discharged through said outlets upon separation of the giblets therefrom, strainer means for screening selected particulate material from the collected chilled water, means for recirculating the collected and screened chilled water to said supply pipe means to provide part of the chilled water supply to said conduits, and water chiller means connected to said supply pipe means to provide a selected proportion of fresh chilled water thereto.

7. Apparatus for transporting and chilling giblets as defined in claim 3, wherein said separating means comprises a perforate separator adjacent said outlets allowing passage of the transporting water therethrough, while separating out the giblets, said collecting means comprising a tank below said separator for receiving the water passed through said separator, and said strainer means comprising an endless belt screen trained about spaced rollers at opposite ends of the tank to define upper and lower flights intercepting the entering path of the water received from the separator, means continuously driving said screen during passage of water therethrough, said tank having an external screen washing receptacle aligned with said screen into which a portion of the screen extends, and means for discharging a spray of cleaning water through the screen portion in said receptacle to dislodge any particles collected thereon and withdraw them along flow paths separated from the water collected in said tank.

8. Apparatus for transporting and chilling giblets as defined in claim 4, wherein said separating means comprises a perforate separator adjacent said outlets allowing passage of the transporting water therethrough, while separating out the giblets, receiving the water passed through said separator, and said strainer means comprising an endless belt screen trained about spaced rollers at opposite ends of the tank to define upper and lower flights intercepting the entering path of the water received from the separator, means continuously driving said screen during passage of water therethrough, said tank having an external screen washing receptacle aligned with said screen into which a portion of the screen extends, and means for discharging a spray of cleaning water through the screen portion in said receptacle to dislodge any particles collected thereon and withdraw them along flow paths separated from the water collected in said tank.

9. Apparatus for transporting and chilling giblets as defined in claim 5, wherein said separating means comprises a perforate separator adjacent said outlet allowing passage of the transporting water therethrough, while separating out the giblets, said collecting means comprising a tank below said separator for receiving the water passed through said separator, and said strainer means comprising an endless belt screen trained about spaced rollers at opposite ends of the tank to define upper and lower flights intercepting the entering path of the water received from the separator, means continuously driving said screen during passage of water therethrough, said tank having an external screen washing receptacle aligned with said screen into which a portion of the screen extends, and means for discharging a spray of cleaning water through the screen portion in said receptacle to dislodge any particles collected thereon and withdraw them along flow paths separated from the water collected in said tank.

10. In apparatus for transporting and chilling giblets wherein the giblets are transported in immersed relation in transporting streams of chilled water along plural tubular conduits defining parallel liquid conveying circuits from a harvesting station adjacent the conduit inlets to a packaging station at the conduit outlets, the apparatus including pump means for imparting pumping action to the chilled water and giblets in the conduits for transporting the giblets to the outlet ends of the conduits; the improvement comprising giblet separating means at the conduit outlets for separating the giblets from the transporting streams of chilled water and discharging the giblets to the packaging station, the separating means including a perforate separator adjacent the conduit outlets allowing passage of the transporting water therethrough while separating out the giblets, collecting means for collecting the chilled water discharged through said outlets upon separation of the giblets therefrom comprising a tank below said separator for receiving the water passed through the separator, strainer means for screening selected particulate material from the collected chilled water comprising an endless belt screen trained about spaced rollers at opposite ends of the tank to define upper and lower flights intercepting the entering path of the water received from the separator, means continuously driving said screen during passage of water therethrough, said tank having an external screen washing receptacle aligned with said screen into which a portion of the screen extends, and means for discharging a spray of cleaning water through the screen portion in said receptacle to dislodge any particles collected thereon and withdraw them along flow paths separated from the water collected in said tank.

11. The method of transporting giblets in a poultry processing room from a giblet harvesting station to a packaging station and concurrently chilling the giblets to a temperature below about 40° F. during transportation thereon thereof between said stations, comprising the steps of directing chilled water in a plurality of continuous enclosed unobstructed fluid streams along a selected conveyance path coextending in substantially parallel relation from an upstream end adjacent the harvesting station to a downstream end at the packaging station along a first rising leg to an overhead level and thence along an elevated overhead leg adjacent the ceiling of the processing room and a descending leg, depositing giblets at said harvesting station in said streams to be carried thereby in immersed relation along said legs to said packaging station and concurrently chilled by thermal exchange with the chilled water, applying pumping forces to the chilled water streams to cause flow of the chilled water and the giblets immersed therein toward the packaging station, subjecting said streams and the giblets carried thereby during flow thereof to said downstream end to physically separated thermal exchange with coolant fluid, separating the giblets from the chilled water stream at the packaging station, and recirculating the chilled water from which the giblets are separated to said upstream end of said streams.

12. The method defined in claim 11, wherein a different type of giblet is deposited in each of said respective streams and is maintained physically separated from the giblets in each other stream throughout travel to said downstream end.

References Cited

UNITED STATES PATENTS

| | | | |
|---|---|---|---|
| 1,420,740 | 6/1922 | Petersen | 62—63X |
| 2,418,746 | 4/1947 | Bartlett et al. | 62—63 |
| 2,794,400 | 6/1957 | Bodine, Jr. | 103—149 |
| 3,180,106 | 4/1965 | Brandt et al. | 103—149X |

WILLIAM E. WAYNER, Primary Examiner

U.S. Cl. X.R.

62—318, 375; 103—149